(12) United States Patent
Li et al.

(10) Patent No.: US 10,007,484 B2
(45) Date of Patent: Jun. 26, 2018

(54) ELECTRONIC DEVICE WITH A PLURALITY OF SOUND ACQUISITION UNITS FOR OPERATING UNDER DIFFERENT OPERATING MODES

(71) Applicant: Lenovo (Beijing) Limited, Beijing (CN)

(72) Inventors: Bin Li, Beijing (CN); Wenjing Shen, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days. days.

(21) Appl. No.: 15/373,310

(22) Filed: Dec. 8, 2016

(65) Prior Publication Data
US 2017/0177299 A1 Jun. 22, 2017

(30) Foreign Application Priority Data
Dec. 18, 2015 (CN) .......................... 2015 1 0958972

(51) Int. Cl.
| | |
|---|---|
| *G06F 3/16* | (2006.01) |
| *G06F 3/01* | (2006.01) |
| *G06F 3/03* | (2006.01) |
| *G10K 11/16* | (2006.01) |
| *H04R 1/40* | (2006.01) |

(Continued)

(52) U.S. Cl.
CPC .............. *G06F 3/167* (2013.01); *G06F 3/011* (2013.01); *G06F 3/0346* (2013.01); *G10K 11/16* (2013.01); *H04R 1/406* (2013.01); *H04R 3/005* (2013.01); *G10K 2210/1082* (2013.01); *G10K 2210/3036* (2013.01); *H04R 2410/01* (2013.01); *H04R 2410/05* (2013.01); *H04R 2499/11* (2013.01)

(58) Field of Classification Search
CPC ... G06F 3/0346; G06F 3/167; G10K 11/1784; G10K 2210/1082; G10K 2210/3036; H04R 1/406; H04R 2410/01; H04R 2410/05; H04R 2499/11; H04R 3/005; H04S 2400/15
USPC .......... 381/26, 71.1, 71.7, 91, 92, 94.1, 122, 381/304, 306, 333, 355, 356, 388; 345/156, 158
See application file for complete search history.

(56) References Cited

U.S. PATENT DOCUMENTS

| | | | |
|---|---|---|---|
| 8,988,381 B1* | 3/2015 | Kim ...................... | G06F 1/1652 345/108 |
| 2013/0010405 A1* | 1/2013 | Rothkopf ............ | H04M 1/0216 361/679.01 |

(Continued)

*Primary Examiner* — David Ton
*Assistant Examiner* — Friedrich W Fahnert
(74) *Attorney, Agent, or Firm* — Yee & Associates, P.C.

(57) ABSTRACT

An electronic device comprising a display unit operable under different operating modes based on a structure of the display unit, and first and second sound acquisition units that acquire sound in a first or second operating mode based on a first or second structure of the display unit. Also provided is a method for controlling an electronic device comprising steps of determining whether a display unit is in a first or second mode, where the display unit is in the first mode when all parts on the display unit are on a same plane, and in the second mode when at least two parts on the display unit are not on the same plane; controlling a first sound acquisition unit to work when the display unit is in the first mode; and controlling a second sound acquisition unit to work when the display unit is in the second mode.

18 Claims, 8 Drawing Sheets

(51) Int. Cl.
  *H04R 3/00* (2006.01)
  *G06F 3/0346* (2013.01)

(56) References Cited

U.S. PATENT DOCUMENTS

| | | | | |
|---|---|---|---|---|
| 2013/0132845 | A1* | 5/2013 | Tammi | G01S 3/8006 |
| | | | | 715/728 |
| 2013/0215041 | A1* | 8/2013 | Kim | G06F 3/0487 |
| | | | | 345/173 |
| 2013/0265221 | A1* | 10/2013 | Lee | G06F 3/01 |
| | | | | 345/156 |
| 2015/0277847 | A1* | 10/2015 | Yliaho | H04M 1/72569 |
| | | | | 381/122 |
| 2016/0026220 | A1* | 1/2016 | Stroetmann | G02F 1/133308 |
| | | | | 345/173 |
| 2016/0062485 | A1* | 3/2016 | Kondo | G09G 5/00 |
| | | | | 345/156 |
| 2016/0187994 | A1* | 6/2016 | La | G06F 1/1652 |
| | | | | 345/619 |
| 2016/0291642 | A1* | 10/2016 | Kwak | G06F 1/1652 |
| 2016/0295323 | A1* | 10/2016 | Yliaho | H04R 3/005 |
| 2016/0299579 | A1* | 10/2016 | Kim | G09G 5/006 |
| 2016/0306393 | A1* | 10/2016 | Huitema | G06F 3/0346 |

* cited by examiner

ELECTRONIC DEVICE WITH A PLURALITY OF SOUND ACQUISITION UNITS FOR OPERATING UNDER DIFFERENT OPERATING MODES

CROSS-REFERENCE TO RELATED APPLICATION

This application claims the benefit of priority to Chinese Patent Application No. 201510958972.6, filed Dec. 18, 2015, the entire contents of which are incorporated herein by reference.

TECHNICAL FIELD

The present invention relates to an electronic device with a plurality of sound acquisition units for operating under different operating modes.

BACKGROUND

With the development of technologies, an increasing number of electronic devices are used among people. Such electronic devices include smart phones, tablet computers, laptop computers and the like, which bring great convenience to people's lives.

At present, with the advancement of flexible screens, flexible electronic devices are emerging, for example, flexible mobile phones, which are bent and worn on user's wrists as smart watches, and are used as smart phones after being stretched. Under these two usage modes, flexible electronic devices need to acquire sound, for example, calls, voice records, audio assistances and the like. However, since in the mobile phone mode and the watch mode, sound input positions are different when the users are making calls in the mobile phone mode, and when the device is in the watch mode.

Therefore, in the related art, there is no reasonable sound acquisition solution with respect to flexible electronic devices.

SUMMARY

An electronic device with multiple modes of operation and multiple sound acquisition units is provided. The electronic device may be a smart phone, a multimedia player, a smart wristband, a smart watch or the like, and is preferably a flexible electronic device.

A first aspect is directed to an electronic device, comprising a body; a display unit arranged with respect to the body, the display unit being operable under a plurality of operating modes based on a structure of the display unit; and a first sound acquisition unit arranged with respect to a first end of the body, a second sound acquisition unit arranged with respect to a second end of the body and a third sound acquisition unit arranged with respect to a third end of the body, the first, second and third ends of the body being different ends and the second and third ends of the body being opposite ends, wherein: at least the first sound acquisition unit and one of the second and third acquisition units acquire sound in a first operating mode of the display unit based on a first structure of the display unit; and at least the second and third acquisition units acquire sound in a second operating mode of the display unit based on a second structure of the display unit.

A second aspect is directed to a method for controlling an electronic device, comprising: determining whether a display unit on a body of the electronic device is in a first mode or in a second mode, wherein when the display unit is in the first mode, all parts on the display unit are on a same plane, and when the display unit is in the second mode, at least two parts on the display unit are not on the same plane; controlling a first sound acquisition unit to work when the display unit is in the first mode; and controlling a second sound acquisition unit to work when the display unit is in the second mode.

In addition, some preferred but optional features or steps have been defined in the dependent claims.

BRIEF DESCRIPTION OF THE DRAWINGS

Some embodiments of the present application will now be described, by way of example only, of which.

DETAILED DESCRIPTION

Embodiment 1

This embodiment of the present invention provides an electronic device. The electronic device may be a smart phone, a multimedia player, a smart wristband, a smart watch or the like, but is not specifically defined in the present invention.

Figure 1:
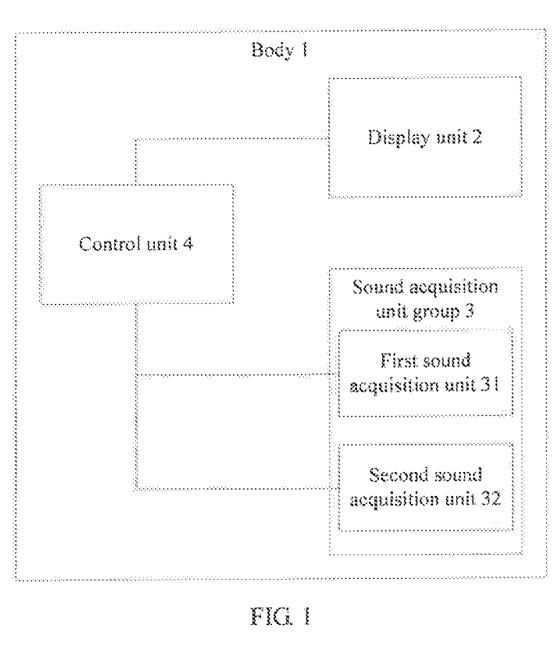
FIG. 1 is a schematic diagram of an electronic device according to Embodiment 1.

As illustrated in FIG. 1, the electronic device comprises: a body 1; a display unit 2, arranged on the body 1, the display unit 2 at least supporting a first mode and a second mode, wherein the display unit 2 is in the first mode if it assumes a planar structure, and the display unit 2 is in the second mode if it assumes a non-planar structure; a sound acquisition unit group 3, comprising at least a first sound acquisition unit 31 and a second sound acquisition unit 32, wherein the first sound acquisition unit 31 is arranged at a first end of the body 1, the second sound acquisition unit 32 is arranged at a second end of the body 1 adjacent to the first end thereof; and a control unit 4, arranged on the body 1, and configured to determine whether the display unit 2 is in the first mode or the second mode, wherein when the display unit 2 is in the first mode, the control unit 4 controls the first sound acquisition unit 31 to work, and when the display unit is in the second mode, the control unit 4 controls the second sound acquisition unit 32 to work.

Figure 2A:
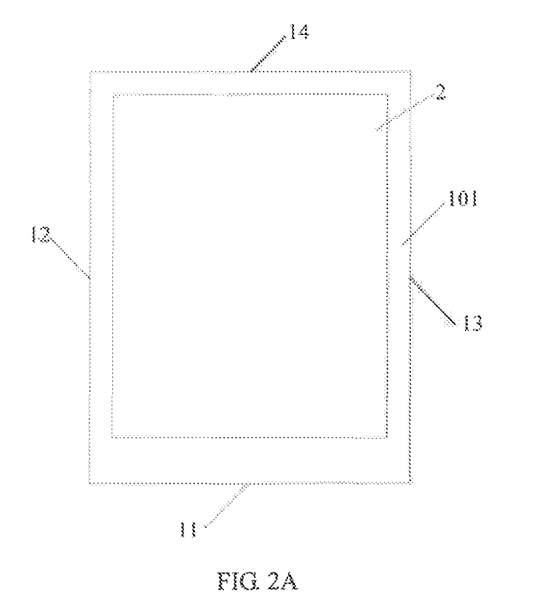
FIGS. 2A and 2B show the electronic device according to Embodiment 1 of FIG. 1.

Firstly, as illustrated in FIG. 2A, the body 1 comprises a first end 11 and a second end 12 that are adjacent to each other, wherein the first sound acquisition unit 31 is arranged at the first end 11, the second sound acquisition unit 32 is arranged on the second end 12, each of the sound acquisition units 31 and 32 has a sound pickup direction, and the sound acquisition units 31 and 32 are capable of acquiring sound signals in the sound pickup directions.

Figure 2B:
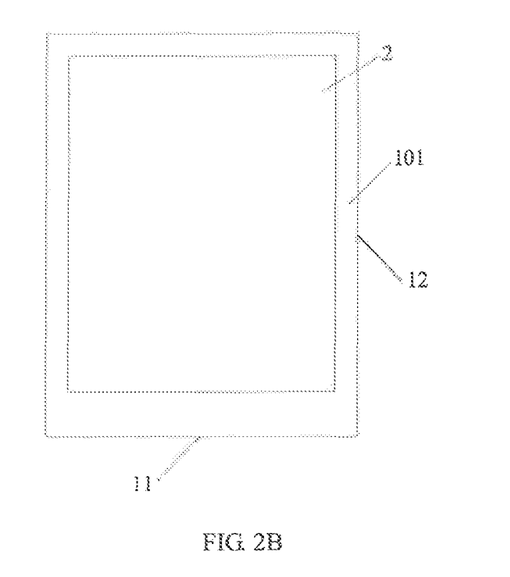

In practical applications, the first end 11 and the second end 12 may also be as illustrated in FIG. 2B, which is not specifically defined in the present invention. In this embodiment, description is given using the scenario illustrated in FIG. 2A as an example.

Figure 3A:
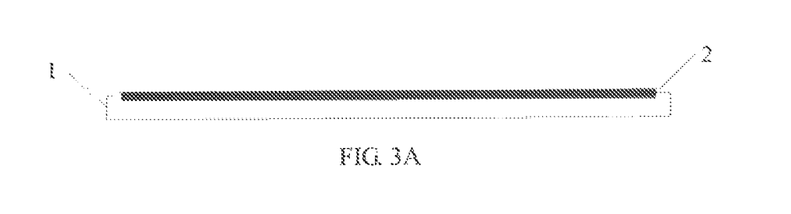
FIGS. 3A and 3B show the electronic device under different operating modes according to Embodiment 1 of FIG. 1.
Figure 3B:
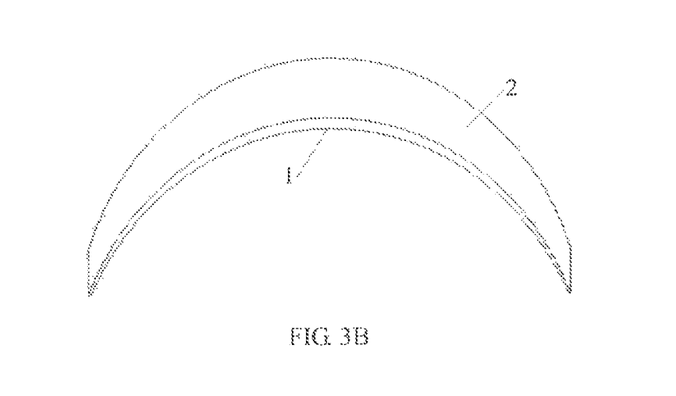

Further, the body 1 further comprises a first surface 101, wherein the display unit 2 is arranged on the first surface 101. As seen from a full perspective, the electronic device according to this embodiment is a flexible device, and when the electronic device is subjected to a structural change, the mode of the display unit 2 changes accordingly. To be specific, the display unit 2 at least supports two modes, that is, a first mode and a second mode. When the electronic device assumes a planar structure, the display unit 2 is in the first mode, and as illustrated in FIG. 3A, all the parts on the display unit 2 are on the same plane. When the electronic device is bent and assumes a non-planar structure, the display unit 2 is in the second mode, and as illustrated in FIG. 3B, at least two parts on the display unit 2 are not on the same plane.

In practical applications, the display unit 2 may be a flexible display screen or may be a flexible touch display screen, for example, a light-emitting diode (LED) screen, an organic light-emitting diode (OLED) screen or the like.

Optionally, since the electronic device is a flexible device, the body 1 may also be flexible and deformable. Likewise, at least one electronic component received in the body 1, for example, a battery, a main board, the control unit 4, the sound acquisition unit 3, a CPU or the like, is also flexible and deformable.

Based on the same inventive concept, this embodiment further provides a method for controlling an electronic device, which is applied in the above electronic device.

The method for controlling an electronic device is described hereinafter with reference to the above electronic device.

Figure 4:
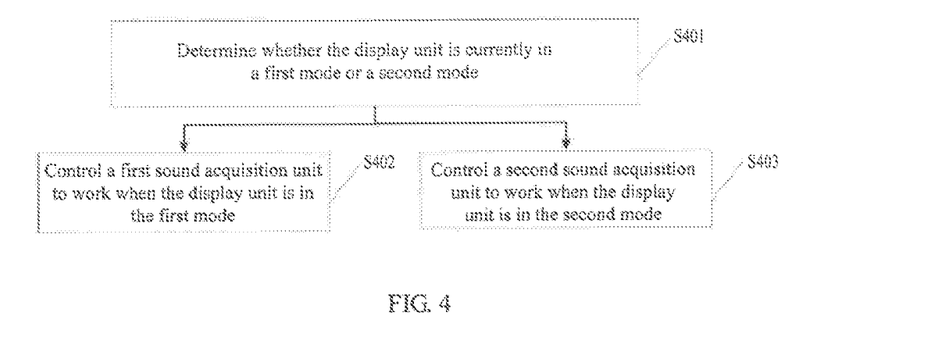
FIG. 4 is a flow diagram of a method for controlling an electronic device according to Embodiment 1 of FIG. 1.

Referring to FIG. 4, the method comprises the following steps:

S401: Determine whether a display unit is in a first mode or a second mode.

To be specific, for example, when a user performs an operation such as voice recording, voice inputting or the like, the display unit may work in different modes, a relative position between the user and the electronic device may be different. Therefore, for convenience of user's operations and for the purpose of a better voice receiving effect, in different modes, different sound acquisition units need to be employed to acquire sound signals of the user such as depicted by S402 and S403. In this case, the electronic device needs to determine whether the display unit is in the first mode or the second mode.

During a specific implementation process, the electronic device may provide a user interface, which allows the user to manually select a current mode of the display unit, and additionally self-detect and determine which mode the display unit is in.

Figure 5:
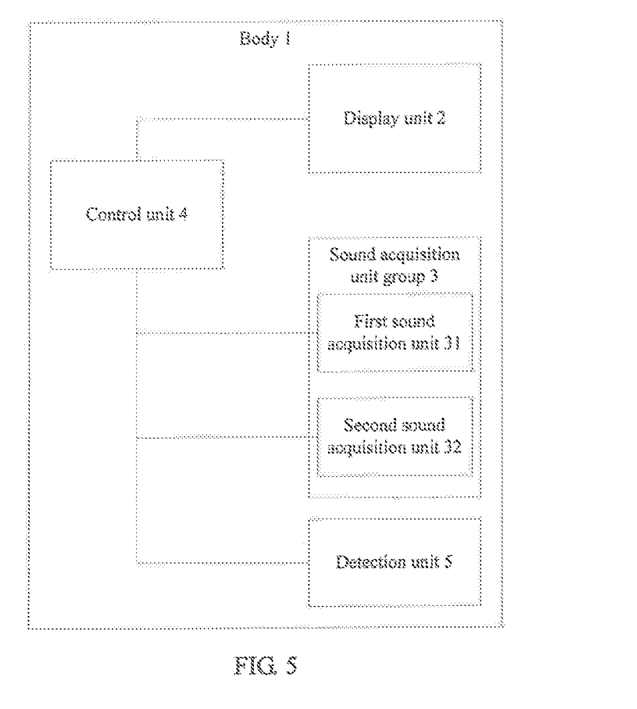
FIG. 5 is another schematic diagram of the electronic device according to a different configuration of Embodiment 1 of FIG. 1.

Exemplarily, as illustrated in FIG. 5, the electronic device further comprises: a detecting unit 5, configured to detect whether the first sound acquisition unit 31 and the second sound acquisition unit 32 satisfy a predetermined relative position.

Correspondingly, the control unit 4 is specifically configured to determine that the display unit 2 is in the first mode when it is detected that the first sound acquisition unit 31 and the second sound acquisition unit 32 satisfy the predetermined relative position, and determine that the display unit 2 is in the second mode when it is detected that the first sound acquisition unit 31 and the second sound acquisition unit 32 do not satisfy the predetermined relative position.

To be specific, the electronic device may further comprise a detection unit 5, which determines the mode of the display unit 2 by detecting a relative position relationship between the first sound acquisition unit 31 and the second sound acquisition unit 32, determines that the display unit 2 is in the first mode when the first sound acquisition unit 31 and the second sound acquisition unit 32 satisfy the predetermined relative position, and determines that the display unit 2 is in the second mode when the first sound acquisition unit 31 and the second sound acquisition unit 32 do not satisfy the predetermined relative position.

For example, the detection unit 5 comprises a first gyroscope arranged in the vicinity of the first sound acquisition unit 31 and a second gyroscope arranged in the vicinity of the second sound acquisition unit 32. In this case, when the display unit 2 is in the first mode, the first sound acquisition unit 31 and the second sound acquisition unit 32 are on the same plane. Then, coordinate values of the first gyroscope and the second gyroscope are recorded. If the display unit 2 is bent, the acquired coordinates acquired by the first gyroscope and the second gyroscope change. The current coordinate values of the first gyroscope and the second gyroscope are recorded. The control unit 4 compares the current coordinate values with the previously recorded coordinate values and acquires a difference between the coordinate values, and further determines a relative position relationship between the first sound acquisition unit 31 and the second sound acquisition unit 32 according to the difference. For example, when the difference is positive, it is determined that the first sound acquisition unit 31 and the second sound acquisition unit 32 satisfy the predetermined relative position. Otherwise, it is determined that the first sound acquisition unit 31 and the second sound acquisition unit 32 do not satisfy the predetermined relative position.

Of course, the detection unit 5 may also be practiced in other manners. Correspondingly, the relative position relationship between the first sound acquisition unit 31 and the second sound acquisition unit 32 may also be determined by using other methods, which are not specifically defined in the present invention.

Figure 6:
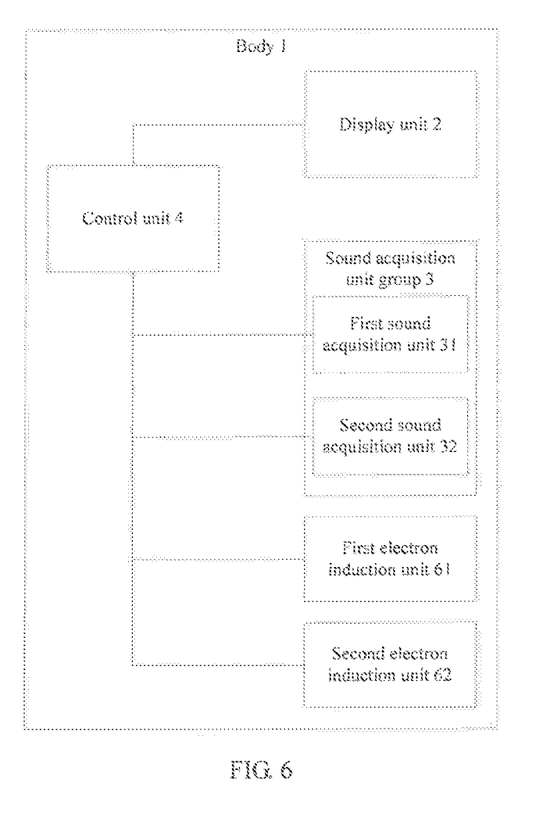
FIG. 6 is another schematic diagram of the electronic device according to Embodiment 1 of FIG. 1.

In another embodiment, as illustrated in FIG. 6, the electronic device may further comprise: a first electron induction unit 61, arranged on the first end 11; and a second electron induction unit 62, arranged at a fourth end 14 of the body 1; herein as illustrated in FIG. 2A, the fourth end 14 is opposite to the first end 11.

Correspondingly, the control unit 4 is specifically configured to determine that the display unit 2 is in the first mode when the first electron induction unit 61 is not coupled to the second electron induction unit 62, and determine that the display unit 2 is in the second mode when the first electron induction unit 61 is coupled to the second electron induction unit 62.

Figure 7:
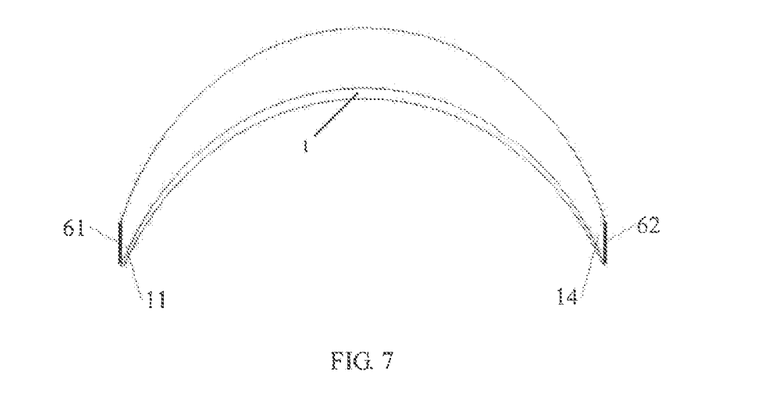
FIG. 7 shows a first electron induction unit and a second electron induction unit according to Embodiment 1 of FIG. 1.

To be specific, as illustrated in FIG. 7, the first electron induction unit 61 is arranged at the first end 11 of the body 1, for example, a Hall device, an electromagnetic coil or the like; and correspondingly, the second electron induction unit 62 is arranged on the fourth end 14 (opposite to the first end 11) of the body 1, wherein the first electron induction unit 61 is capable of being coupled to the second electron induction unit 62. In this case, the control unit 4 may determine the current mode of the display unit by detecting whether the first electron induction unit 61 is coupled to the second electron induction unit 62. In other words, the control unit 4 determines that the display unit 2 is in the first mode when the first electron induction unit 61 is not coupled to the second electron induction unit 62; and the control unit 4 determines that the display unit 2 is in the second mode when the first electron induction unit 61 is coupled to the second electron induction unit 62.

In practical applications, the mode of the display unit may also be detected by using other methods.

S402: When the display unit is in the first mode, the first sound acquisition unit is controlled to work.

S403: When the display unit is in the second mode, the second sound acquisition unit is controlled to work.

As such, the process of controlling different sound acquisition units to work when the display unit 2 is in different modes is implemented.

In this embodiment, different sound acquisition units are controlled to work when the display unit is in different modes, such that the flexible electronic device achieves a better sound receiving effect in different structures. For example, when the display unit assumes a planar structure and is in the first mode, during use and based on user behavior, the user would generally speak in the first sound acquisition unit. In this case, if the first sound acquisition unit is controlled to work, clear sound signals may be acquired and a better sound receiving effect may be achieved. Likewise, when the display unit assumes a non-planar structure and is in the second mode, based on user behavior, the user would generally speak in the second sound acquisition unit. In this case, if the first sound acquisition unit is controlled to work, clear sound signals may be acquired and a better sound receiving effect may be achieved. This further improves the degree of intelligence of the electronic device and provides good user experience.

Embodiment 2

Based on Embodiment 1 described above, when the display unit is in the first mode, to further achieve a better sound receiving effect, noise reduction may also be performed to the acquired sound signals.

In this case, step S402 may comprise: when the display unit is in the first mode, controlling the first sound acquisition unit to work as a primary acquisition unit, and controlling the second sound acquisition unit as a secondary acquisition unit, such that the first sound acquisition unit coordinates with the second sound acquisition unit to perform noise reduction for the acquired sound signals.

Figure 8:
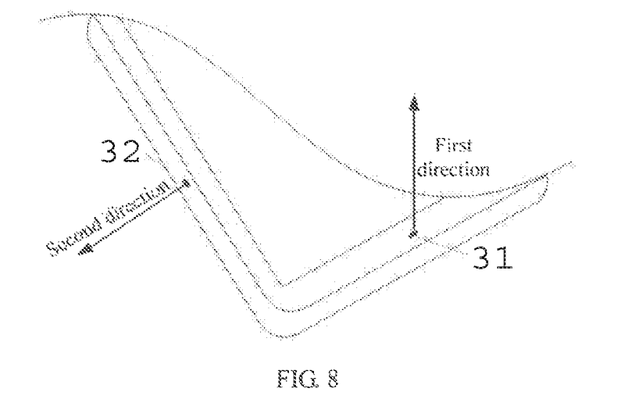
FIG. 8 shows different sound pickup directions of different sound acquisition units according to Embodiment 2.

It should be noted that, according to noise reduction requirements of the two sound acquisition units, when the display unit is in the first mode, a sound pickup direction of the first sound acquisition unit and a sound pickup direction of the second sound acquisition unit satisfy a first relative position relationship. For example, as illustrated in FIG. 8, if the first sound acquisition unit 31 faces a first direction, the sound pickup direction thereof is the first direction; and if the second sound acquisition unit 32 faces a second direction, the sound pickup direction thereof is the second direction. In this case, the sound signal acquired by the first sound acquisition unit 31 and the sound signal acquired by the second sound acquisition unit 32 cause no interference to each other, thereby achieving a better noise reduction effect.

Certainly, the sound pickup directions of the first sound acquisition unit and the second sound acquisition unit may be defined otherwise, but is not specifically defined in the present invention.

In this embodiment, when the display unit is in the first mode, the first sound acquisition unit and the second sound acquisition unit are controlled to work collaboratively, to perform noise reduction for the sound signal acquired by the first sound acquisition unit, thereby providing good user experience.

Embodiment 3

Figure 9:
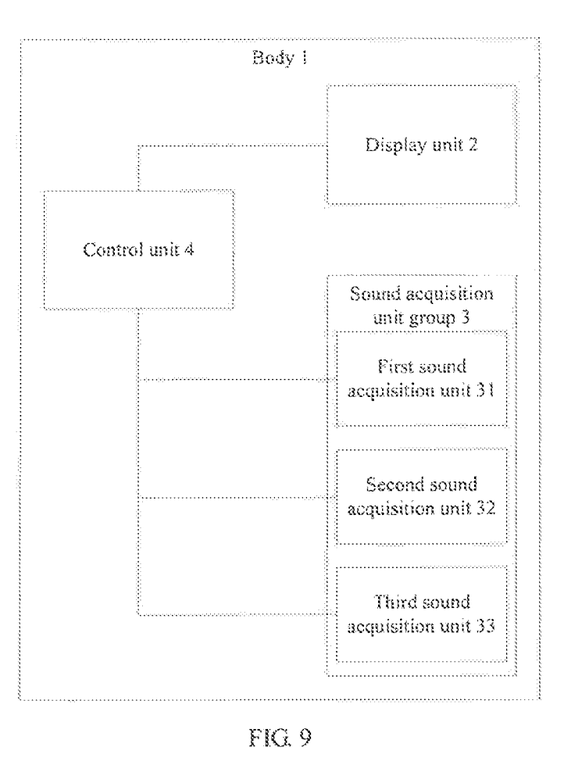
FIG. 9 is a schematic diagram of an electronic device according to Embodiment 3.

Based on Embodiment 2 described above, when the display unit is in the second mode, to further achieve a better sound receiving effect, noise reduction is performed for the acquired sound signals. As illustrated in FIG. 9, the sound acquisition unit group 3 further comprises: a third sound acquisition unit 33, arranged at a third end opposite to the second end of the body 1, wherein a sound pickup direction of the second sound acquisition unit 32 and a sound pickup direction of the third sound acquisition unit 33 satisfy a second relative position relationship, and the sound signal acquired by the second sound acquisition unit and the sound signal acquired by the third sound acquisition unit cause no interference to each other.

In this case, the control unit 4 controls the third sound acquisition unit 33 to work while controlling the second sound acquisition unit 32 to work, and controls the first sound acquisition unit 31 to be disabled, such that the second sound acquisition unit coordinates with the third sound acquisition unit to perform noise reduction for the sound signals.

To be specific, the third sound acquisition unit 33 is arranged at the third end of the body 1. As illustrated in FIG. 2A, the third end 13 is opposite to the second end 12. When the display unit is in the second mode, according to behaviors of the user, the second sound acquisition unit 32 and the third sound acquisition unit 33 coordinate with each other to perform noise reduction for the sound signals. In this case, the control unit 4 may control the second sound acquisition unit 32 to work as a primary acquisition unit, and control the third sound acquisition unit 33 to work as a secondary acquisition unit, and disable the first sound acquisition unit 31.

Figure 10:
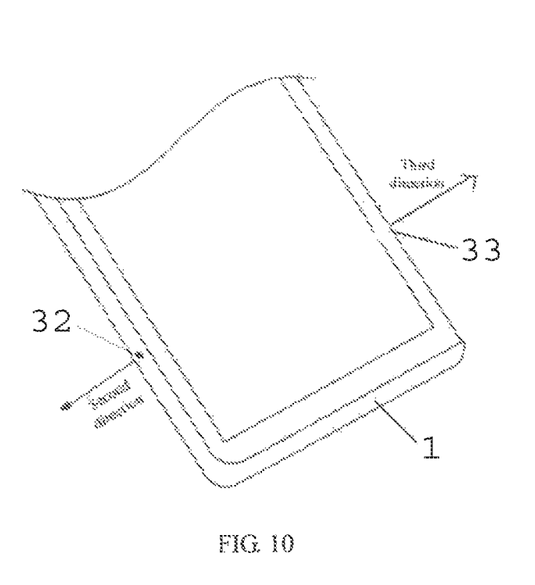
FIG. 10 shows different sound pickup directions of different sound acquisition units according to Embodiment 3.

Further, according to noise reduction requirements of the double sound acquisition units, the sound pickup direction of the second sound acquisition unit 32 and a sound pickup direction of the third sound acquisition unit 33 (not visible from the perspective view of the display unit as shown in FIG. 10) satisfy a second relative position relationship. For example, as illustrated in FIG. 10, if the second sound acquisition unit faces a second direction, the sound pickup direction thereof is the second direction; and if the third sound acquisition unit faces a third direction, the sound pickup direction thereof is the third direction. In this case, the sound signal acquired by the second sound acquisition unit and the sound signal acquired by the third sound acquisition unit cause no interference to each other, thereby achieving a better noise reduction effect.

Certainly, the sound pickup directions of the second sound acquisition unit and the third sound acquisition unit may be defined otherwise, but is not specifically defined in the present invention.

In this embodiment, when the display unit is in the first mode, the second sound acquisition unit and the third sound acquisition unit are controlled to work collaboratively and the first sound acquisition unit is disabled, to perform noise reduction for the sound signal acquired by the second sound acquisition unit, thereby providing good user experience.

Embodiment 4

Based on the same inventive step, this embodiment provides a method for controlling an electronic device. The method is applied to the electronic device as described in the above one or more embodiments.

Referring to FIG. 4, the method comprises the following steps:

S401: Determine whether a display unit on the body of the electronic device is in a first mode or a second mode.

S402: A first sound acquisition unit is controlled to work when the display unit is in the first mode, wherein the first sound acquisition unit is arranged at a first end of the body.

S403: A second sound acquisition unit is controlled to work when the display unit is in the second mode, wherein the second sound acquisition unit is arranged at a second end adjacent to the first end of the body.

In the above technical solution, step S401 comprises: detecting whether the first sound acquisition unit and the second sound acquisition unit satisfy a predetermined relative position; determining that the display unit is in the first mode when it is detected that the first sound acquisition unit and the second sound acquisition unit satisfy a predetermined relative position; and determining that the display unit is in the second mode when it is detected that the first sound acquisition unit and the second sound acquisition unit do not satisfy the predetermined relative position.

In the above technical solution, step S401 comprises: detecting whether the first electron induction unit arranged at the first end is coupled to the second electron induction unit arranged at a fourth end of the body, wherein determining that the display unit is in the first mode when the first electron induction unit is not coupled to the second electron induction unit, and determining that the display unit is in the second mode when the first electron induction unit is coupled to the second electron induction unit.

In the above technical solution, when a sound pickup direction of the first sound acquisition unit and a sound pickup direction of the second sound acquisition unit satisfy a first relative position relationship, a sound signal acquired by the first sound acquisition unit and a sound signal acquired by the second sound acquisition unit cause no interference to each other; then step S402 comprises: when the display unit is in the first mode, controlling the first sound acquisition unit to work as a primary acquisition unit, and controlling the second sound acquisition unit to work as a secondary acquisition unit, such that the first sound acquisition unit coordinates with the second sound acquisition unit to perform noise reduction for the acquired sound signals.

In the above technical solution, the electronic device further comprises: a third sound acquisition unit, arranged at a third end opposite to the second end of the body, wherein when the sound pickup direction of the second sound acquisition unit and a sound pickup direction of the third sound acquisition unit satisfy a second relative position, and a sound signal acquired by the second sound acquisition unit and a sound signal acquired by the third sound acquisition unit cause no interference to each other.

Correspondingly, step S403 comprises: when the display unit is in the second mode, controlling the second sound acquisition unit and the third sound acquisition unit to work, and meanwhile controlling the first sound acquisition unit to be disabled, such that the second sound acquisition unit coordinates with the third sound acquisition unit to perform noise reduction for the sound signals.

In the above technical solution, the controlling the second sound acquisition unit and the third sound acquisition unit to work comprises: controlling the second sound acquisition unit to work as a primary acquisition unit, and controlling the third sound acquisition unit to work as a secondary acquisition unit.

It should be noted that the functions implemented in the method for controlling an electronic device may also be implemented by invoking a program code by means of the control unit in the electronic device. Certainly, the program code may also be stored in a computer storage medium.

In addition, description of the above method embodiments is similar to the description of the above electronic device, which achieves the same beneficial effects of the method embodiments, therefore is not described herein any further. With respect to the technical details not disclosed in the method embodiments of the present invention, a person skilled in the art would reach full understanding with reference to the description of the electronic device embodiments of the present invention. For brevity of description, such details are not described herein any further.

A person skilled in the art should understand that the phrase "one embodiment" or "an embodiment" referenced in this specification signifies that particular characteristics, structures, or features may be combined in at least one embodiment consistent with this disclosure. Therefore, the appearances of the phrase "in one embodiment" or "in an embodiment" in this specification do not necessarily refer to the same embodiment. In addition, the described characteristics, structures, or features may be incorporated in one or more embodiments in any suitable manner. It should be understood that in various embodiments of the present invention, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present invention. The sequence numbers of the embodiments of the present invention are only for ease of description, but do not denote the preference of the embodiments.

It should be noted that, in this specification, terms "comprises", "comprising", "has", "having", "includes", "including", "contains", "containing" or any other variation thereof, are intended to cover a non-exclusive inclusion, such that a process, method, article, or apparatus, that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus.

In the several embodiments provided in the present invention, it should be understood that the disclosed device and method may be practiced in other manners. The above described device embodiments are merely illustrative. For example, the unit division is merely logical function division and may be other divisions in actual practice. For example, multiple units or components may be combined or integrated into another system, or some features can be ignored or not performed. In addition, the displayed or discussed mutual couplings or direct couplings or communication connections of the various constitutional parts are practiced through some interfaces. The indirect couplings or communication connections between the devices or units may be practiced in electronic, mechanical or other forms.

The units used as separate components may be or may not be physically independent of each other. The element illustrated as a unit may be or may not be a physical unit, that is, it can be either located at a position or deployed on a plurality of network units. A part or all of the units may be selected according to the actual needs to achieve the objectives of the solutions of the embodiments.

In addition, the functional units in the various embodiments of the present invention may be integrated in one processing unit, or may separately and physically exist as a single unit, or two or more units may be integrated into one unit. The integrated unit may be practiced by means of a hardware, or may also be practiced in a form of a hardware and a software functional unit.

Persons of ordinary skill in the art may understand that all or part of steps according to the embodiments of the present invention may be executed by a program instructing relevant hardware. The programs may be stored in a computer readable storage medium. When the programs are executed, the steps of the method in the embodiment are executed. The storage medium includes various media, such as a mobile storage device, a read-only memory (ROM), a magnetic disk, a compact disc read-only memory (CD-ROM) or the like media which is capable of storing program code.

Alternatively, if the integrated unit according to the present invention is implemented in the form of a software functional unit and sold or used as a separate product, it may also be stored in a computer-readable storage medium. Based on such understandings, the technical solutions or part of the technical solutions disclosed in the present invention that makes contributions to the prior art may be essentially embodied in the form of a software product. The software product may be stored in a storage medium. The software product includes a number of instructions that enable a computer (a PC, a server, a network device, or the like) device to execute all or a part of the steps of the methods provided in the embodiments of the present invention. The storage medium comprises: a mobile storage device, a ROM, a magnetic disk, a CR-ROM or the like medium which is capable of storing program code.

The above embodiments are used only for illustrating the present invention, and are not intended to limit the protection scope of the present invention. Various modifications and replacements readily derived by those skilled in the art within technical disclosure of the present invention shall fall within the protection scope of the present invention. Therefore, the protection scope of the present invention is subject to the claims.

What is claimed is:

1. An electronic device, comprising:
a body;
a display unit arranged with respect to the body, the display unit being operable under a plurality of operating modes based on a structure of the display unit; and
a first sound acquisition unit arranged with respect to a first end of the body, a second sound acquisition unit arranged with respect to a second end of the body and a third sound acquisition unit arranged with respect to a third end of the body, the first, second and third ends of the body being different ends and the second and third ends of the body being opposite ends;
wherein:
at least the first sound acquisition unit and one of the second and third acquisition units (second/third acquisition units) acquire sound in a first operating mode of the display unit based on a first structure of the display unit; and
at least one of the second and third acquisition units acquire sound in a second operating mode of the display unit based on a second structure of the display unit, where the display unit is a flexible display unit, wherein the first structure of the display unit is a planar structure and the second structure of the display unit is a non-planar, curved structure.

2. The electronic device of claim 1, wherein in the first operating mode of the display unit, at least one of the first and second/third acquisition units functions as a voice acquisition unit and the other of the first and second/third acquisition units functions as a noise acquisition unit for noise suppression.

3. The electronic device of claim 1, wherein in the second operating mode of the display unit, at least one of the second and third acquisition units functions as a voice acquisition unit and the other of the second and third acquisition units functions as a noise acquisition unit for noise suppression.

4. The electronic device of claim 1, wherein when a sound pickup direction of the first sound acquisition unit and a sound pickup direction of the second sound acquisition unit satisfy a first relative position relationship, a sound signal acquired by the first sound acquisition unit and a sound signal acquired by the second sound acquisition unit cause no interference to each other.

5. The electronic device of claim 1, further comprising:
a control unit, arranged on the body, and configured to determine whether the display unit is in the first operating mode or the second operating mode; wherein when the display unit is in the first operating mode, the control unit controls the first sound acquisition unit to work, and when the display unit is in the second operating mode, the control unit controls the second sound acquisition unit to work.

6. The electronic device of claim 5, wherein the control unit is further configured to, when the display unit is in the second operating mode, control the third sound acquisition unit to work, and control the first sound acquisition unit to be disabled, such that the second sound acquisition unit coordinates with the third sound acquisition unit to perform noise reduction for sound signals.

7. The electronic device of claim 6, wherein the control unit is further configured to, when the display unit is in the second operating mode, control the second sound acquisition unit to work as the primary acquisition unit, and control the third sound acquisition unit to work as the secondary acquisition unit.

8. The electronic device of claim 1, further comprising:
a detection unit configured to detect whether the first sound acquisition unit and the second sound acquisition unit satisfy a predetermined relative position; and
a control unit configured to determine that the display unit is in the first operating mode when it is detected that the first sound acquisition unit and the second sound acquisition unit satisfy the predetermined relative position, and determine that the display unit is in the second operating mode when it is detected that the first sound acquisition unit and the second sound acquisition unit do not satisfy the predetermined relative position.

9. An electronic device, comprising:
a body;
a display unit arranged with respect to the body, the display unit being operable under a plurality of operating modes based on a structure of the display unit; and
a first sound acquisition unit arranged with respect to a first end of the body, a second sound acquisition unit arranged with respect to a second end of the body and a third sound acquisition unit arranged with respect to a third end of the body, the first, second and third ends of the body being different ends and the second and third ends of the body being opposite ends;
a detection unit configured to detect whether the first sound acquisition unit and the second sound acquisition unit satisfy a predetermined relative position; and
a control unit configured to determine that the display unit is in the first operating mode when it is detected that the first sound acquisition unit and the second sound acquisition unit satisfy the predetermined relative position, and determine that the display unit is in the second operating mode when it is detected that the first sound acquisition unit and the second sound acquisition unit do not satisfy the predetermined relative position;
wherein:
at least the first sound acquisition unit and one of the second and third acquisition units (second/third acquisition units) acquire sound in a first operating mode of the display unit based on a first structure of the display unit; and
at least one of the second and third acquisition units acquire sound in a second operating mode of the display unit based on a second structure of the display unit, wherein the detection unit comprises a first gyroscope arranged in a vicinity of the first sound acquisition unit, and a second gyroscope arranged in a vicinity of the second sound acquisition unit.

10. An electronic device, comprising:
a body;
a display unit arranged with respect to the body, the display unit being operable under a plurality of operating modes based on a structure of the display unit;
a first sound acquisition unit arranged with respect to a first end of the body, a second sound acquisition unit arranged with respect to a second end of the body and a third sound acquisition unit arranged with respect to a third end of the body, the first, second and third ends of the body being different ends and the second and third ends of the body being opposite ends;
a first electron induction unit arranged at the first end of the body; and
a second electron induction unit arranged at a fourth end opposite to the first end of the body;
wherein the control unit is configured to determine that the display unit is in the first operating mode when the first electron induction unit is not coupled to the second electron induction unit, and determine that the display unit is in the second operating mode when the first electron induction unit is coupled to the second electron induction unit;
wherein:
at least the first sound acquisition unit and one of the second and third acquisition units (second/third acquisition units) acquire sound in a first operating mode of the display unit based on a first structure of the display unit; and
at least one of the second and third acquisition units acquire sound in a second operating mode of the display unit based on a second structure of the display unit.

11. A method for controlling an electronic device, comprising steps of:
determining whether a display unit on a body of the electronic device is in a first mode or in a second mode, wherein when the display unit is in the first mode, all parts on the display unit are on a same plane, and when the display unit is in the second mode, at least two parts on the display unit are not on the same plane;
controlling a first sound acquisition unit to work when the display unit is in the first mode; and
controlling a second sound acquisition unit to work when the display unit is in the second mode.

12. The method of claim 11, wherein determining whether the display unit is in the first mode or in the second mode comprises:
detecting whether the first sound acquisition unit and the second sound acquisition unit satisfy a predetermined relative position with respect to one another;
determining that the display unit is in the first mode when it is detected that the first sound acquisition unit and the second sound acquisition unit satisfy the predetermined relative position; and
determining that the display unit is in the second mode when it is detected that the first sound acquisition unit and the second sound acquisition unit do not satisfy the predetermined relative position.

13. The method of claim 12, wherein detecting whether the first sound acquisition unit and the second sound acquisition unit satisfy a predetermined relative position comprises:
recording a first current coordinate value of a first gyroscope arranged in a vicinity of the first sound acquisition unit;
recording a second current coordinate value of a second gyroscope arranged in a vicinity of the first sound acquisition unit; and
comparing the first current coordinate value with a previously recorded first coordinate value of the first gyroscope and comparing the second current coordinate value with a previously recorded second coordinate value of the second gyroscope to form a difference between coordinate values.

14. The method of claim 11, wherein determining whether the display unit is in the first mode or in the second mode comprises:
detecting whether a first electron induction unit arranged at the first end is coupled to a second electron induction unit arranged at a fourth end of the body, wherein the first end is opposite to the fourth end; and
determining that the display unit is in the first mode when the first electron induction unit is not coupled to the second electron induction unit, and determining that the display unit is in the second mode when the first electron induction unit is coupled to the second electron induction unit.

15. The method of claim 11, wherein controlling the first sound acquisition unit to work when the display unit is in the first mode comprises:
when the display unit is in the first mode, controlling the first sound acquisition unit to work as a primary acquisition unit and controlling the second sound acquisition unit to work as a secondary acquisition unit, such that the first sound acquisition unit coordinates with the second sound acquisition to perform noise reduction for acquired sound signals; wherein when a sound pickup direction of the first sound acquisition unit and a sound pickup direction of the second sound acquisition unit satisfy a first relative position relationship, a sound signal acquired by the first sound acquisition unit and a sound signal acquired by the second sound acquisition unit cause no interference to each other.

16. The method of claim 11, wherein controlling the second sound acquisition unit to work when the display unit is in the second mode comprises:

when the display unit is in the second mode, controlling the second sound acquisition unit and a third sound acquisition unit to work, and controlling the first sound acquisition unit to be disabled, such that the second sound acquisition unit coordinates with the third sound acquisition unit to perform noise reduction for the sound signals, wherein the third sound acquisition unit is arranged at a third end opposite to the second end of the body, and when a sound pickup direction of the second sound acquisition unit and a sound pickup direction of the third sound acquisition unit satisfy a second relative position relationship, and a sound signal acquired by the second sound acquisition unit and a sound signal acquired by the third sound acquisition unit cause no interference to each other.

17. The method of claim 16, wherein controlling the second sound acquisition unit and the third sound acquisition unit to work comprises:

controlling the second sound acquisition unit to work as a primary acquisition unit, and controlling the third sound acquisition unit to work as a secondary acquisition unit.

18. The method of claim 11, wherein the first sound acquisition unit is arranged at a first end of the body, and the second sound acquisition unit is arranged at a second end of the body adjacent to the first end of the body.

* * * * *